United States Patent Office 2,759,906
Patented Aug. 21, 1956

2,759,906

VINYL CHLORIDE RESIN STABILIZED WITH A TETRAVALENT TIN XANTHATE COMPOUND

William E. Leistner, Brooklyn, and Arthur C. Hecker, Richmond Hill, N. Y., assignors to Argus Chemical Laboratory, Inc., a corporation of New York No Drawing. Application May 20, 1952,
Serial No. 289,012

3 Claims. (Cl. 260—45.75)

The present invention relates to novel organic derivatives of tetravalent tin and to compositions containing the same. This is a continuation in part of Serial No. 270,531, filed February 7, 1952, now U. S. Patent No. 2,641,596.

The derivatives according to our invention are derived from tetravalent tin by having at least one valence and at the utmost three valences linked to the sulfur atom of an anion of a xanthic acid, while the remaining valence or valences are bound to an alkyl, aryl, hydroaromatic or heterocyclic radical.

The compounds are represented by the type formula $$R_n\text{—Sn—}(S.\overset{S}{\overset{\|}{C}}.OR_1)_{4-n}$$

wherein R stands for a radical selected from the group consisting of alkyl, aryl, hydroaromatic or heterocyclic radicals $$(S.\overset{S}{\overset{\|}{C}}.OR_1)$$

for an anion of an alkyl xanthic acid, and $n$ for an integral number from 1 to 3.

Examples for R are alkyls, such as methyl, ethyl, butyl, octyl, dodecyl, and octadecyl; aryls, such as phenyl, tolyl, or xylyl; oxyalkyl and oxyaryl, such as $C_3H_7O$, $C_4H_9O$, $C_8H_{17}O$, $C_6H_5O$, $C_6H_4(CH_3)O$, $C_6H_3(CH_3)_2O$; and the furfuryl and tetrahydrofurfuryl groups.

Examples for the anions of alkyl xanthic acides are anions of methyl xanthic acid, ethyl xanthic acid, propyl xanthic acid, isopropyl xanthic acid, butyl xanthic acid, octyl xanthic acid, or higher substituted xanthic acids up to 18 carbon atoms.

Taking as specific examples the butyl tin isopropyl xanthates, the product may have the following formulas:

(1) 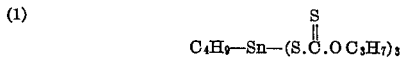

(2) 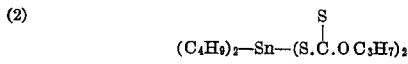

(3) 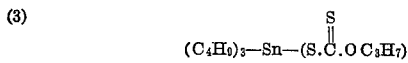

The novel tin compounds according to our invention are light-reddish colored solid materials, whose composition has in each case been ascertained by analysis.

They are soluble in many organic solvents, for instance in ether, benzene, toluene, chloroform, carbontetrachloride, etc.

A general method to prepare these compounds is to react the desired alkali xanthate with an organic tin halide.

The invention will now be illustrated by a number of examples, but it should be understood that these are given by way of illustration and not of limitation and that many variations in the compounds given and the amounts indicated can be made without departing from the spirit of the invention and the scope of the appended claims.

EXAMPLE 1

*The preparation of dibutyl-tin di-isopropyl xanthate*

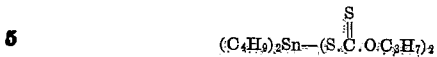

10 g. dibutyl tin dichloride
10.5 g. sodiumisopropyl xanthate, and
10 g. toluene are refluxed for ½ hour, and the sodium chloride filtered off. The filtrate is a red colored solution; after evaporation of the toluene, a reddish, solid residue is obtained, which is soluble in many organic solvents, for instance in ether, benzene, toluene, chloroform, carbontetrachloride, etc.

Analysis:

|  | Sn | S |
|---|---|---|
| Calc | 23.5 | 25.5 |
| Found | 22.8 | 25.3 |

EXAMPLE 2

*Preparation of benzyl-tin tributyl xanthate*

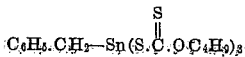

10 g. monobenzyl tin tribromide,
12 g. sodium butyl xanthate, and
15 g. toluene are reacted as described in Example 1. The sodium bromide is filtered off. The residue remaining after evaporation of the toluene is similar in every respect to the product of Example 1.

Analysis:

|  | Sn | S |
|---|---|---|
| Calc | 18.0 | 29.4 |
| Found | 17.5 | 29.0 |

EXAMPLE 3

*Preparation of tri-isopropyl tin butyl xanthate*

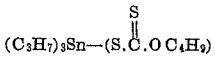

14 g. tri-isopropyl tin chloride
10 g. potassium butyl xanthate
10 g. toluene are refluxed as described in Example 1. The potassium chloride formed in the reaction is filtered off. The residue remaining after evaporation of the toluene is similar in every respect to the product of Example 1.

Analysis:

|  | Sn | S |
|---|---|---|
| Calc | 29.8 | 16.15 |
| Found | 29.0 | 15.8 |

The novel compounds made according to the method described above may be used for various purposes. They are excellent stabilizers for chlorinated resins or other high molecular weight halogenated materials, and may be used as antioxidants. They may also be interesting as such, or as intermediates for pharmaceuticals and cosmetics.

In case the compounds are used as stabilizers, the amount by weight of the same will be from 0.1–10%, In the following, an example will be given for the manufacture of a plastic film, in which the compound according to the present invention is used as a stabilizer.

EXAMPLE 4

100 parts of Vinylite VYNW (a copolymer of vinyl chloride and vinyl acetate), 50 parts of dioctylphthalate, and 2 parts of the product made according to Example 1 as stabilizer are mixed by tumbling for a period of one hour. The whole mass is then transferred to a Banbury mixer and fused for 10 min. at a temperature of approximately 300° F. It is then dropped and transferred to a warmup, whose roll temperature is likewise maintained at 300° F. The material is then fed as needed to a 3 or 4 roll calender. The roll temperatures of the calender range from 280° to 350° F. The vinyl compound is calenedered into a film at 0.004 inch or any other desirable gage.

EXAMPLE 5

A comparison test was made in which chlorinated paraffin was heated over a period of time, without any addition on the one hand, and with addition of a stabilizer made according to the invention on the other hand.

In this test, a nitrogen current was passed through chlorinated paraffin containing 40% chlorine, at a temperature of 150° F. for 12 hours. During the test, the paraffin lost 10% chlorine.

The same chlorinated paraffin, to which 3% of the product obtained in Example 2 were added, was treated in a similar manner and showed a loss of only 1% chlorine after 12 hours.

EXAMPLE 6

The following procedure is used to advantage in making a finished solution of the resin. We use 100 parts of Vinylite VYNW (a copolymer of vinyl chloride and vinyl acetate). This is weighed into a dry blender, 40 parts of tricresyl phosphate and 1 part of stabilizer (made as described in Example 3) is then added. The whole mass is agitated by tumbling for 30 minutes and then transferred to a 2-roll mill whose roll temperatures are at about 240° F. The mass is fluidized on the mill and then sheeted into strips which are added to a mixture consisting of 3 parts of methyl ethyl ketone and 1 part of toluene in a conventional mixer. The compound is agitated at room temperature in the mixer until complete solution results. The proportion of solvent used will vary with the concentration of solution desired, as, for instance, from 500 to 3,000 parts of solvent to 100 parts of the vinyl chloride resin used.

What we claim is:

1. A vinyl chloride resin containing a stabilizing amount of a product corresponding to the formula

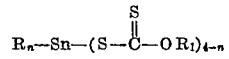

wherein R stands for a radical selected from the group consisting of alkyl and aryl radicals, $R_1$ for an alkyl radical containing 2–18 carbon atoms, and $n$ for an integral number from 1–3.

2. The composition of claim 1 wherein the product is dibutyl tin diisopropyl xanthate.

3. The composition of claim 1 wherein the product is tripropyl tin butylxanthate.

References Cited in the file of this patent

UNITED STATES PATENTS

| | | |
|---|---|---|
| 2,288,288 | Lincoln | June 30, 1942 |
| 2,368,670 | Lincoln et al. | Feb. 6, 1945 |
| 2,560,034 | Eberly | July 10, 1951 |

OTHER REFERENCES

Annalen der Chemie, vol. 122, 1862, Leipzig, pages 87–91.